United States Patent
Srinivasan et al.

(10) Patent No.: US 12,045,731 B2
(45) Date of Patent: Jul. 23, 2024

(54) AUTOMATED EMPATHETIC RECONCILIATION OF DECISIONS OF ARTIFICIAL INTELLIGENCE (AI) MODELS

(71) Applicant: FUJITSU LIMITED, Kawasaki (JP)

(72) Inventors: Ramya Malur Srinivasan, San Diego, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 609 days.

(21) Appl. No.: 17/301,365

(22) Filed: Mar. 31, 2021

(65) Prior Publication Data

US 2022/0318640 A1 Oct. 6, 2022

(51) Int. Cl.
*G06N 5/01* (2023.01)
*G06F 18/20* (2023.01)
*G06Q 30/02* (2023.01)
*H04L 67/306* (2022.01)

(52) U.S. Cl.
CPC ............ *G06N 5/01* (2023.01); *G06F 18/285* (2023.01); *G06Q 30/0281* (2013.01); *H04L 67/306* (2013.01)

(58) Field of Classification Search
CPC .... G06N 5/01; G06F 18/285; G06Q 30/0281; H04L 67/306
USPC ........................................................ 706/47
See application file for complete search history.

(56) References Cited

U.S. PATENT DOCUMENTS

| | | | |
|---|---|---|---|
| 11,080,617 B1* | 8/2021 | Bansal | G06F 16/235 |
| 11,403,538 B1* | 8/2022 | Verma | G06N 5/045 |
| 2022/0012591 A1* | 1/2022 | Dalli | G06N 3/082 |
| 2022/0147876 A1* | 5/2022 | Dalli | G06N 20/00 |
| 2022/0198254 A1* | 6/2022 | Dalli | G06N 5/01 |

OTHER PUBLICATIONS

Kusner, Matt, et al. "Counterfactual fairness." Proceedings of the 31st International Conference on Neural Information Processing Systems. 2017, arXiv:1703.06856v3 [stat.ML] Mar. 8, 2018, 18 pages.

(Continued)

*Primary Examiner* — Alan S Chou
(74) *Attorney, Agent, or Firm* — Fujitsu Intellectual Property Center; Tiep H. Nguyen

(57) ABSTRACT

In an embodiment, operations include receiving first information associated with a first person and a first request of the first person to one or more institutions. A set of attributes of the first person is extracted and used to construct a causal model. The causal model represents causal relationships amongst attributes of the set of attributes. For the first person, a utility function associated with each of a plurality of AI models associated with the one or more institutions is determined. The utility function is determined based on the causal model, a first set of empathy criteria associated with the first person, and a second set of empathy criteria associated with each of the one or more institutions. For the utility function, optimin-point information is determined to reconcile a plurality of decisions taken by the plurality of AI models for the first request. The reconciled decision is rendered.

20 Claims, 5 Drawing Sheets

(56) References Cited

OTHER PUBLICATIONS

Pleiss, Geoff, et al. "On fairness and calibration." Proceedings of the 31st International Conference on Neural Information Processing Systems. 2017, arXiv:1709.02012v2 [cs.LG] Nov. 3, 2017, 19 pages.

Ismail, Mehmet S. "One for all, all for one—von Neumann, Wald, Rawls, and Pareto I. Theory", arXiv:1912.00211v4 [econ.TH] May 29, 2020, 37 pages.

Besse, Philippe, et al. "A survey of bias in Machine Learning through the prism of Statistical Parity for the Adult Data Set." arXiv:2003.14263v2 [stat.ML] Apr. 6, 2020, 25 pages.

Corbett-Davies, Sam, and Sharad Goel. "The Measure and Mismeasure of Fairness: A Critical Review of Fair Machine Learning." (2018), obtained from https://5harad.com/papers/fair-ml.pdf, 25 pages.

Duke Computer Science, "Fairness in ML 2: Equal opportunity and odds—Privacy & Fairness in Data Science CompSci 590.01 Fall 2018", obtained from https://www2.cs.duke.edu/courses/fall18/compsci590.1/lectures/FairML2.pdf, 23 slides (pages).

Hardt, Moritz, et al., "Equality of Opportunity in Supervised Learning", obtained from https://5harad.com/papers/fair-ml.pdf, 22 pages.

Verma, Sahil, and Julia Rubin. "Fairness definitions explained." 2018 IEEE/ACM international workshop on software fairness (fairware). IEEE, 2018, https://fairware.cs.umass.edu/papers/Verma.pdf, 7 pages.

European Patent Office; Extended European Search Report dated Jul. 11, 2022, and mailed in connection with EP Patent Application No. EP 22 15 3419, which is a counterpart application to U.S. Appl. No. 17/301,365.

FUTO Ivan, "Machine Learning or Expert Systems that Is the Question, Which Is to be Used by a Public Administration," Mar. 1, 2020 (Mar. 1, 2020), ARXIV.ORG, pp. 204-218.

European Patent Office; Communication Pursuant to Article 94(3) EPC [Office Action], dated Jun. 29, 2023, and mailed in connection with EP Patent Application No. EP 22 15 3419, which is a counterpart application to U.S. Appl. No. 17/301,365.

* cited by examiner

AUTOMATED EMPATHETIC RECONCILIATION OF DECISIONS OF ARTIFICIAL INTELLIGENCE (AI) MODELS

FIELD

The embodiments discussed in the present disclosure are related to automated empathic reconciliation of decisions of Artificial Intelligence (AI) models.

BACKGROUND

Advancements in the field of machine learning and Artificial Intelligent (AI) have led to development of numerous machine learning and AI based decisioning tools. Such tools may be used by various institutions to take decisions related to evaluation of various types of applications associated with a person. Example of such application associated with the person may include, but are not limited to, a loan application. However, certain machine learning and AI based tools may be biased in decision making. For example, certain tools may be biased based on a gender (or age, race, or caste) of the person.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include a set of operations which may include receiving first information associated with a first person. The first information may be further associated with a first request of the first person to one or more institutions. The set of operations may further include extracting a set of attributes associated with the first person from the received first information. The set of attributes may include at least one of a set of need-related attributes, a set of protected attributes, or a set of outcome-related attributes associated with the first person. The set of operations may further include constructing a causal model based on the extracted set of attributes associated with the first person. The constructed causal model may represent a set of causal relationships amongst attributes from the extracted set of attributes. The set of operations may further include determining, for the first person, a utility function associated with each of a plurality of Artificial Intelligence (AI) models associated with the one or more institutions. The determination of the utility function may be based on the constructed causal model, a first set of empathy criteria associated with the first person, and a second set of empathy criteria associated with each of the one or more institutions. The set of operations may further include determining optimin-point information for the determined utility function associated with each of the plurality of AI models. The determined optimin-point information may correspond to a reconciled decision from a plurality of decisions taken by the plurality of AI models of the one or more institutions for the first request associated with the first person. The set of operations may further include rendering the reconciled decision.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
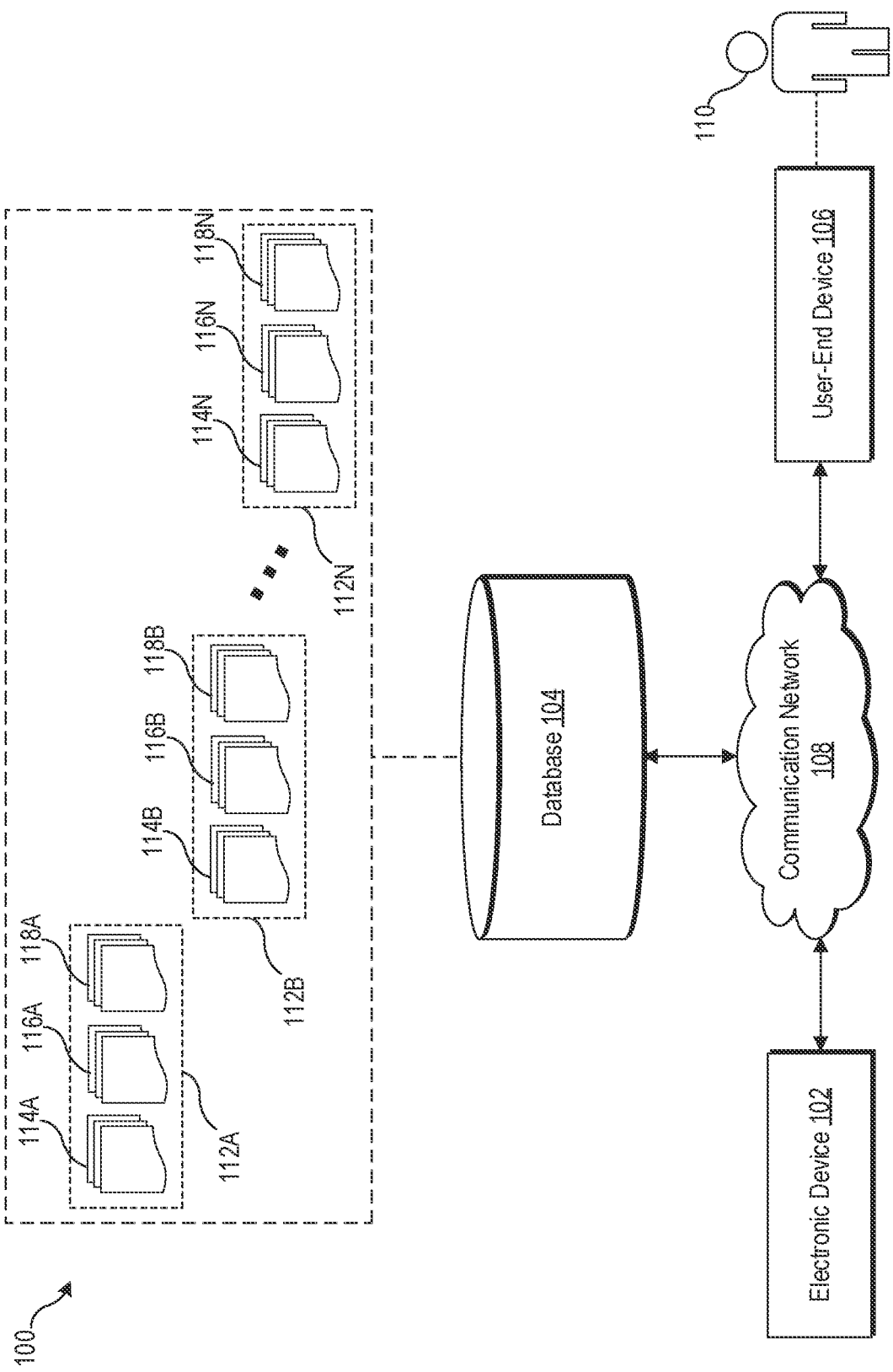
FIG. 1 is a diagram representing an example environment related to automated empathetic reconciliation of decisions of Artificial Intelligence (AI) models.

Some embodiments described in the present disclosure relate to methods and systems for an automated empathic reconciliation of decisions of Artificial Intelligence (AI) models. In the present disclosure, first information associated with a first person may be received. The first information may be further associated with a first request of the first person made to one or more institutions. A set of attributes associated with the first person may be extracted from the received first information. The set of attributes may include at least one of a set of need-related attributes, a set of protected attributes, or a set of outcome-related attributes associated with the first person. Thereafter, a causal model may be constructed based on the extracted set of attributes associated with the first person. The constructed causal model may represent a set of causal relationships amongst attributes from the extracted set of attributes. For the first person, a utility function associated with each of a plurality of Artificial Intelligence (AI) models may be determined. The plurality of AI models may be associated with the one or more institutions. The determination of the utility function may be based on the constructed causal model, a first set of empathy criteria associated with the first person, and a second set of empathy criteria associated with each of the one or more institutions. Further, optimin-point information may be determined for the determined utility function associated with each of the plurality of AI models. The determined optimin-point information may correspond to a reconciled decision from a plurality of decisions taken by the plurality of AI models of the one or more institutions for the first request associated with the first person. Further, the reconciled decision may be rendered.

According to one or more embodiments of the present disclosure, the technological field of automated assessment of a request of a person to one or more institutions may be improved by configuring a computing system in a manner that the computing system may be able to empathically reconcile decisions taken by multiple AI models of the one or more institutions for the request with minimal biases. The computing system may determine a utility function for each of a plurality of AI models that may be used by the one or more institutions for decision-making. The utility function may be determined based on a causal model, a first empathy criteria associated with the person, and a second empathy criteria associated with the one or more institutions. The causal model may indicate causal relationships between different attributes (e.g., a set of protected attributes) associated with the person. The utility function for a certain AI model may be indicative of a profit gained by the one or more institutions when the particular AI model takes a certain decision, for example, a decision to accept the request of the person. The utility function may factor in a fairness towards the person based on the set of protected attributes of the person determined based on the causal model. Further, the utility function may incorporate empathy towards the person (i.e. based on the first set of empathy criteria) who requests to the one or more institutions and also towards the one or more institutions (i.e. based on the second set of empathy criteria) who assess the request based on a plurality of decisions of the AI models. To reconcile the plurality of decisions of the plurality of AI models, the computing system may then determine optimin-point information for the determined utility function for each of the plurality of AI models. The determined optimin-point information may indicate a reconciled decision from the plurality of decisions taken by the plurality of AI models for the request for the person. Thus, the plurality of decisions taken by the plurality of AI models associated with the one or more institutions may be reconciled into a single reconciled decision for the request. The reconciled decision may be fair and empathetic towards the person and may also be empathetic towards the one or more institutions.

The system may be configured to receive first information associated with a first person. The first information may be further associated with a first request of the first person to one or more institutions. Examples of the one or more institutions may include one of, but are not limited to, a banking institution, an insurance institution, a hiring organization, an education institute, a travel-related institute, or a judicial court. The first request of the first person may include at least one of, but not limited to, a loan application, an insurance application, a job application, an admission application, a visa application, or a judicial petition application. An example of the first information is further provided, for example, in FIG. 4.

The system may be further configured to extract a set of attributes associated with the first person from the received first information. The set of attributes may include at least one of, but not limited to, a set of need-related attributes, a set of protected attributes, or a set of outcome-related attributes associated with the first person. The set of need-related attributes associated with the first person may correspond to a purpose for the first request of the first person to the one or more institutions. Further, the set of protected attributes associated with the first person may include at least one of, but not limited to, an age, a gender, a race, a caste, a salary, a nationality, or a physical disability associated with the first person. The set of outcome-related attributes associated with the first person may correspond to one or more outcomes associated with one or more decisions taken by an AI model of the one or more institutions for the first request associated with the first person. Further, the set of outcome-related attributes associated with the first person may also correspond to one or more long-term benefits associated with the first person. The extraction of the set of attributes is described further, for example, in FIGS. 3 and 4.

The system may be further configured to construct a causal model based on the extracted set of attributes associated with the first person. The constructed causal model may represent a set of causal relationships amongst attributes from the extracted set of attributes. The construction of the causal model may be based on at least one of a user input or a structural learning model. An example of the causal model is provided, for example, in FIG. 4.

The system may be further configured to determine, for the first person, a utility function associated with each of a plurality of AI models. The plurality of AI models may be associated with the one or more institutions. The determination of the utility function may be based on the constructed causal model, a first set of empathy criteria associated with the first person, and a second set of empathy criteria associated with each of the one or more institutions. The first set of empathy criteria associated with the first person may include at least one of, but not limited to, a first criteria associated with one or more of the set of protected attributes associated with the first person, a second criteria associated with one or more of the set of need-related attributes associated with the first person, and a third criteria associated with one or more of the set of outcome-related attributes associated with the first person. The second set of empathy criteria associated with each of the one or more institutions may correspond to a threshold related to a cost associated with an acceptance of the first request provided by the one or more institutions. The determination of the utility function is described further, for example, in FIG. 3.

The system may be further configured to determine optimin-point information for the determined utility function associated with each of the plurality of AI models. The determined optimin-point information may correspond to a reconciled decision from a plurality of decisions taken by the plurality of AI models of the one or more institutions for the first request associated with the first person. Herein, a decision of an AI model, from the plurality of AI models, may be one of an acceptance or a rejection of the first request of the first person given by the corresponding AI model of the one or more institutions. The system may be further configured to render the reconciled decision. The determination of the optimin-point information is described further, for example, in FIGS. 3 and 5.

Typically, conventional systems may not incorporate empathy in an automated assessment of a request of a person made to one or more institutions. Conventional systems may only use attributes (such as, an income, educational qualifications, etc.) which may be directly used for taking a decision for the request (e.g., a loan application) of the person, without consideration of needs of the person, such as, for higher education, or outcomes related to an acceptance of a request, such as, a better quality of life. Further, the conventional systems may have biases with respect to certain factors (e.g., protected attributes of the person) such as, but not limited to, an age, a gender, a race, a caste, a salary, a nationality, or a physical disability of the person. Thus, the conventional systems may not be empathic or fair towards the person for the automated evaluation of the request of the person to the one or more institutions. Further, the conventional systems may evaluate the request of the person solely on the basis of the factors associated with the person and not incorporate factors associated with the one or more institutions, thereby not being empathetic towards the one or more institutions in the decision-making process.

The disclosed system, on the other hand, may empathically reconcile decisions taken by the plurality of AI models associated with the one or more institutions for a request (i.e. the first request) of a person (i.e. the first person) with minimal biases. The causal model indicative of causal relationships between different attributes (e.g., the set of protected attributes, the set of need-related attributes, and the set of outcome-related attributes) associated with the first person may be constructed. Further, the utility function may be determined for each of the plurality of AI models used by the one or more institutions for decision-making. The utility function may be determined based on the causal model, the first empathy criteria associated with the first person, and the second empathy criteria associated with the one or more institutions. The utility function for a certain AI model may be indicative of a profit gained by the one or more institutions when the particular AI model takes a certain decision, for example, a decision to accept the first request of the first person. The utility function may also factor in a fairness towards the first person based on the set of protected attributes of the first person, determined based on the causal model. Further, the utility function may also incorporate empathy towards the first person, based on the first set of empathy criteria (e.g., the second criteria associated with the set of need-related attributes and the third criteria associated with the set of outcome-related attributes). In addition, the utility function may also incorporate empathy towards the one or more institutions, based on the second set of empathy criteria (e.g., the threshold associated with the cost to accept the first request of the first person). The disclosed system may further reconcile the plurality of decisions of the plurality of AI models based on a determination of the optimin-point information for the determined utility function for each of the plurality of AI models. The determined optimin-point information may indicate the reconciled decision from the plurality of decisions taken by the plurality of AI models for the first request for the first person. Thus, the plurality of decisions taken by the plurality of AI models associated with the one or more institutions may be reconciled into a single reconciled decision for the first request. The reconciled decision may be fair and empathetic towards the first person and may also be empathetic towards the one or more institutions.

Embodiments of the present disclosure are explained with reference to the accompanying drawings.

FIG. 1 is a diagram representing an example environment related to automated empathetic reconciliation of decisions of Artificial Intelligence (AI) models, arranged in accordance with at least one embodiment described in the present disclosure. With reference to FIG. 1, there is shown an environment 100. The environment 100 may include an electronic device 102, a database 104, a user-end device 106, and a communication network 108. The electronic device 102, the database 104, and the user-end device 106 may be communicatively coupled to each other, via the communication network 108. In FIG. 1, there is further shown a user 110 who may be associated with or operating the electronic device 102 or the user-end device 106. There is further shown first information 112A associated with a first person, first information 112B associated with a second person, and so on, to first information 112N associated with an Nth person. The first information 112A may include a set of attributes (e.g., a set of need-related attributes 114A, a set of protected attributes 116A, and a set of outcome-related attributes 118A) associated with the first person. The first information 112B may include a set of attributes (e.g., a set of need-related attributes 114B, a set of protected attributes 116B, and a set of outcome-related attributes 118B) associated with the second person. Similarly, the first information 112N may include a set of attributes (e.g., a set of need-related attributes 114N, a set of protected attributes 116N, and a set of outcome-related attributes 118N) associated with the Nth person. The first information 112A associated with the first person, the first information 112B associated with the second person, and so on to, the first information 112N associated with the Nth person may be stored in the database 104.

The electronic device 102 may include suitable logic, circuitry, interfaces, and/or code that may be configured to empathetically assess a request of a person made to one or more institutions based on automatic reconciliation of decisions of a plurality AI models associated with the one or more institutions. The electronic device 102 may be configured to receive the first information 112A associated with the first person from the database 104. The first information may be further associated with a first request of the first person that may be made to the one or more institutions. A decision of an AI model, from the plurality of AI models, may be one of an acceptance or a rejection of the first request of the first person given by the one or more institutions. Examples of the one or more institutions may include one of, but are not limited to, a banking institution, an insurance institution, a hiring organization, an education institute, a travel-related institute, or a judicial court. The first request of the first person may include at least one of, but not limited to, a loan application, an insurance application, a job application, an admission application, a visa application, or a judicial petition application. An example of the first information 112A is provided, for example, in FIG. 4.

The electronic device 102 may be configured to extract a set of attributes associated with the first person from the received first information 112A. The set of attributes may include at least one of, but not limited to, the set of need-related attributes 114A, the set of protected attributes 116A, or the set of outcome-related attributes 118A associated with the first person. The set of need-related attributes 114A associated with the first person may correspond to a purpose or need for the first request of the first person to the one or more institutions. Further, the set of protected attributes 116A associated with the first person may include at least one of, but not limited to, an age, a gender, a race, a caste, a salary, a nationality, or a physical disability associated with the first person. The set of outcome-related attributes 118A associated with the first person may correspond to one or more outcomes associated with one or more decisions taken by an AI model of the one or more institutions for the first request associated with the first person. Further, the set of outcome-related attributes 118A associated with the first person may also correspond to one or more long-term benefits associated with the first person. The extraction of the set of attributes is described further, for example, in FIGS. 3 and 4.

The electronic device 102 may be configured to construct a causal model based on the extracted set of attributes associated with the first person. The constructed causal model may represent a set of causal relationships amongst attributes from the extracted set of attributes. The construction of the causal model may be based on at least one of a user input or a structural learning model. An example of the causal model is provided, for example, in FIG. 4.

The electronic device 102 may be configured to determine, for the first person, a utility function associated with each of a plurality of AI models. The plurality of AI models may be associated with the one or more institutions. The determination of the utility function may be based on the constructed causal model, a first set of empathy criteria associated with the first person, and a second set of empathy criteria associated with each of the one or more institutions. The first set of empathy criteria associated with the first person may include at least one of, but not limited to, a first criteria associated with one or more of the set of protected attributes 116A associated with the first person, a second criteria associated with one or more of the set of need-related attributes 114A associated with the first person, and a third criteria associated with one or more of the set of outcome-related attributes 118A associated with the first person. The second set of empathy criteria associated with each of the one or more institutions may correspond to a threshold related to a cost associated with an acceptance of the first request of the first person provided by the one or more institutions. The determination of the utility function is described further, for example, in FIG. 3.

The electronic device 102 may be further configured to determine optimin-point information for the determined utility function associated with each of the plurality of AI models. The determined optimin-point information may correspond to a reconciled decision from a plurality of decisions taken by the plurality of AI models of the one or more institutions for the first request associated with the first person. Herein, a decision of an AI model, from the plurality of AI models, may be one of an acceptance or a rejection of the first request of the first person given by the one or more institutions (or by the corresponding AI model of the one or more institutions). The electronic device 102 may be further configured to render the reconciled decision. The determination of the optimin-point information is described further, for example, in FIGS. 3 and 5.

Examples of the electronic device 102 may include, but are not limited to, a recruitment engine or machine, a loan evaluation engine, a judicial machine, a mobile device, a desktop computer, a laptop, a computer work-station, a computing device, a mainframe machine, a server, such as a cloud server, and a group of servers. In one or more embodiments, the electronic device 102 may include a user-end terminal device and a server communicatively coupled to the user-end terminal device. The electronic device 102 may be implemented using hardware including a processor, a microprocessor (e.g., to perform or control performance of one or more operations), a field-programmable gate array (FPGA), or an application-specific integrated circuit (ASIC). In some other instances, the electronic device 102 may be implemented using a combination of hardware and software.

The database 104 may include suitable logic, interfaces, and/or code that may be configured to store first information associated with a plurality of persons. The first information of a person may include information related to the set of attributes associated with the person. For example, the database 104 may store the first information 112A associated with the first person, the first information 112B associated with the second person, and so on to, the first information 112N associated with the Nth person. The database 104 may be a relational or a non-relational database. Also, in some cases, the database 104 may be stored on a server, such as a cloud server or may be cached and stored on the electronic device 102. The server of the database 104 may be configured to receive a query for the first information (e.g., the first information 112A) associated with a person (e.g., the first person) from the electronic device 102, via the communication network 108. In response, the server of the database 104 may be configured to retrieve and provide the queried first information associated with the particular person to the electronic device 102 based on the received query, via the communication network 108. In some embodiments, the database 104 may include a plurality of servers stored at different locations. Additionally, or alternatively, the database 104 may be implemented using hardware including a processor, a microprocessor (e.g., to perform or control performance of one or more operations), a field-programmable gate array (FPGA), or an application-specific integrated circuit (ASIC). In some other instances, the database 104 may be implemented using a combination of hardware and software.

The user-end device 106 may include suitable logic, circuitry, interfaces, and/or code that may be configured to generate or receive first information (such as, the first information 112A) of a person (e.g., the first person). For example, the user-end device 106 may include a web-client software or an electronic mail software, through which the user-end device 106 may receive the first information of the particular person. Additionally, or alternatively, the user-end device 106 may include a word or text processing software through which the first information (e.g., the set of attributes) of the particular person may be generated based on user input from the user 110 or from the person himself/herself. The user-end device 106 may upload the generated or received first information associated with the particular person to the electronic device 102 for extraction of the set of attributes associated with the person. In addition, the user-end device 106 may upload the generated or received first information to the database 104 for storage.

The user-end device 106 may be further configured to receive the reconciled decision of the plurality of AI models for a request (e.g., the first request) of a person (e.g., the first person), from the electronic device 102. The user-end device 106 may render the received reconciled decision for the request of the person on a display screen of the user-end device 106 for the user 110. In some embodiments, the user-end device 106 may receive a query from the user 110 to assess a request (e.g., the first request) of a person (e.g., the first person) to the one or more institutions and provide a decision (i.e., a reconciled decision) for the request based on the assessment of the request of the person. The user-end device 106 may further send the query to the electronic device 102 for the determination of the reconciled decision of the plurality of AI models for the request of the person. Examples of the user-end device 106 may include, but are not limited to, a mobile device, a desktop computer, a laptop, a computer work-station, a computing device, a mainframe machine, a server, such as a cloud server, and a group of servers. Although in FIG. 1, the user-end device 106 is separated from the electronic device 102; however, in some embodiments, the user-end device 106 may be integrated in the electronic device 102, without a deviation from the scope of the disclosure.

The communication network 108 may include a communication medium through which the electronic device 102 may communicate with the servers which may store the database 104, and the user-end device 106. Examples of the communication network 108 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 104 and the user-end device 106. In addition, in some embodiments, the functionality of each of the database 104 and the user-end device 106 may be incorporated into the electronic device 102, without a deviation from the scope of the disclosure.

Figure 2:
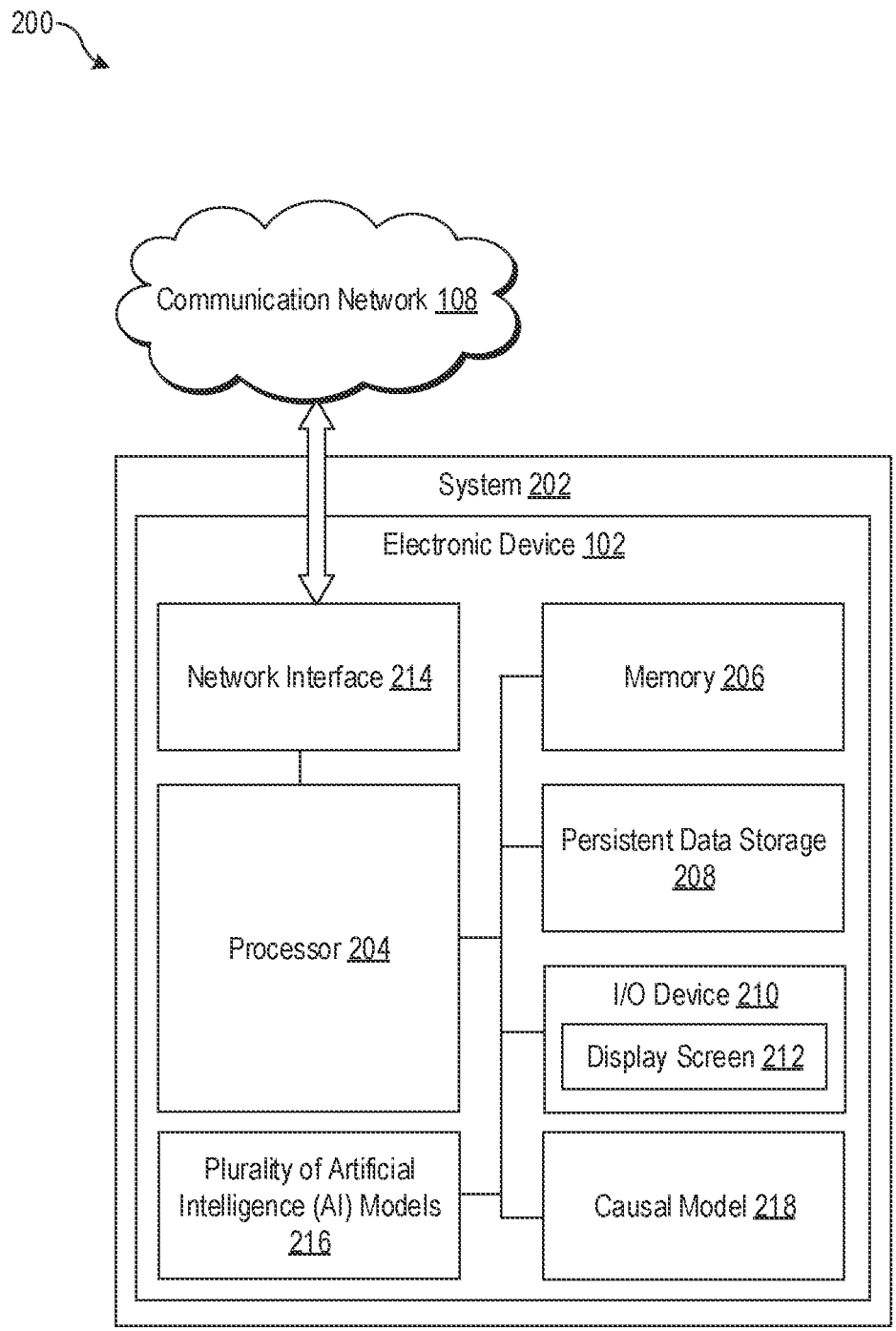
FIG. 2 is a block diagram that illustrates an exemplary electronic device for automated empathetic reconciliation of decisions of Artificial Intelligence (AI) models.

FIG. 2 is a block diagram that illustrates an exemplary electronic device for automated empathetic reconciliation of decisions of Artificial Intelligence (AI) models, arranged in accordance with at least one embodiment described in the present disclosure. FIG. 2 is explained in conjunction with elements from FIG. 1. With reference to FIG. 2, there is shown a block diagram 200 of a system 202 including the electronic device 102. The electronic device 102 may include a processor 204, a memory 206, a persistent data storage 208, an input/output (I/O) device 210, a display screen 212, a network interface 214, and a plurality of Artificial Intelligence (AI) models 216, and a causal model 218.

The processor 204 may include suitable logic, circuitry, and/or interfaces that may be configured to execute program instructions associated with different operations to be executed by the electronic device 102. For example, some of the operations may include receiving the first information 112A, extracting the set of attributes, constructing the causal model (e.g., the causal model 218), determining the utility function, determining the optimin-point information, and rendering the reconciled decision. The processor 204 may include any suitable special-purpose or general-purpose computer, computing entity, or processing device including various computer hardware or software modules and may be configured to execute instructions stored on any applicable computer-readable storage media. For example, the processor 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 204 may be configured to interpret and/or execute program instructions and/or process data stored in the memory 206 and/or the persistent data storage 208. In some embodiments, the processor 204 may fetch program instructions from the persistent data storage 208 and load the program instructions in the memory 206. After the program instructions are loaded into the memory 206, the processor 204 may execute the program instructions. Some of the examples of the processor 204 may be a Graphics Processing Unit (GPU), a Central Processing Unit (CPU), a Reduced Instruction Set Computer (RISC) processor, an ASIC processor, a Complex Instruction Set Computer (CISC) processor, a co-processor, and/or a combination thereof.

The memory 206 may include suitable logic, circuitry, interfaces, and/or code that may be configured to store program instructions executable by the processor 204. In certain embodiments, the memory 206 may be configured to store operating systems and associated application-specific information. The memory 206 may include computer-readable storage media for carrying or having computer-executable instructions or data structures stored thereon. Such computer-readable storage media may include any available media that may be accessed by a general-purpose or special-purpose computer, such as the processor 204. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The persistent data storage 208 may include suitable logic, circuitry, interfaces, and/or code that may be configured to store program instructions executable by the processor 204, operating systems, and/or application-specific information, such as logs and application-specific databases. The persistent data storage 208 may include computer-readable storage media for carrying or having computer-executable instructions or data structures stored thereon. Such computer-readable storage media may include any available media that may be accessed by a general-purpose or a special-purpose computer, such as the processor 204.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

In some embodiments, either of the memory 206, the persistent data storage 208, or combination may store first information (e.g., the first information 112A) of a person (e.g., the first person) received from the database 104, the extracted set of attributes of the person, and the constructed causal model (e.g., the causal model 218). Either of the memory 206, the persistent data storage 208, or combination may further store the plurality of AI models 216, the utility function for each of the plurality of AI models 216, the determined optimin-point information, the plurality of decisions taken by the plurality of AI models 216, and the reconciled decision.

Each of the plurality of AI models 216 may be a computational network or a system of artificial neurons, arranged in a plurality of layers, as nodes. The plurality of layers of each AI model (of the plurality of AI models 216) may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the AI model. Outputs of each hidden layer may be coupled to inputs of at least one node in other layers of the AI model. Node(s) in the final layer may receive inputs from at least one hidden layer to output a result. The number of layers and the number of nodes in each layer may be determined from hyper-parameters of the AI model. Such hyper-parameters may be set before or while training the AI model on a training dataset.

Each node of the AI model may correspond to a mathematical function (e.g., a sigmoid function or a rectified linear unit) with a set of parameters, tunable during training of the AI model. The set of parameters may include, for example, a weight parameter, a regularization parameter, and the like. Each node may use the mathematical function to compute an output based on one or more inputs from nodes in other layer(s) (e.g., previous layer(s)) of the AI model. All or some of the nodes of the AI model may correspond to same or a different mathematical function. In training of the AI model, one or more parameters of each node of the AI model may be updated based on whether an output of the final layer for a given input (from the training dataset) matches a correct result based on a loss function for the AI model. The above process may be repeated for same or a different input till a minima of loss function may be achieved and a training error may be minimized. Several methods for training are known in art, for example, gradient descent, stochastic gradient descent, batch gradient descent, gradient boost, meta-heuristics, and the like.

Each AI model may include electronic data, such as, for example, a software program, code of the software program, libraries, applications, scripts, or other logic or instructions for execution by a processing device, such as the processor 204. Each AI model may include code and routines configured to enable a computing device including the processor 204 to perform one or more tasks such as, taking a decision for a request of a person to the one or more institutions. Additionally, or alternatively, the AI model may be implemented using hardware including a processor, a microprocessor (e.g., to perform or control performance of one or more operations), a field-programmable gate array (FPGA), or an application-specific integrated circuit (ASIC). Alternatively, in some embodiments, the AI model may be implemented using a combination of hardware and software.

Examples of the plurality of AI models 216 may include, but are not limited to, a deep neural network (DNN), a convolutional neural network (CNN), an artificial neural network (ANN), a fully connected neural network, a deep Bayesian neural network, and/or a combination of such networks. In some embodiments, the plurality of AI models 216 may include numerical computation techniques using data flow graphs. In certain embodiments, the plurality of AI models 216 may be based on a hybrid architecture of multiple Deep Neural Networks (DNNs). In some embodiments, the plurality of AI models 216 may include a Machine Learning (ML) model that may be a classifier, or a lustering model which may be trained to identify a relationship between inputs, such as features in a training dataset (i.e. the first information) and output labels (i.e. decision for the request of the person made to the one or more institutions).

The causal model 218 may be a mathematical model represented by a directed acyclic graph of variables, such as, the set of attributes associated with a person (e.g., the first person). The causal model 218 may represent a set of causal relationships between attributes from the set of attributes. The directed acyclic graph of the causal model 218 may include directed edges outgoing from a node associated with an input variables to a node associated with an output variable having a causal relationship with the input variable. An input variable (such as, one or more first attributes (e.g., gender and age) from the set of attributes) may be a variable which may affect another variable, such as, an output variables through a causal relationship. The output variable (such as, one or more second attributes (e.g., income) from the set of attributes) may be a variable which may be affected by the input variable through the causal relationship.

The I/O device 210 may include suitable logic, circuitry, interfaces, and/or code that may be configured to receive a user input. For example, the I/O device 210 may receive a user input to retrieve the first information (e.g., the first information 112A) associated with the person (e.g., the first person). In another example, the I/O device 210 may receive a user input to generate the first information associated with the person, or to edit an existing dataset including the first information associated with the person, and/or store the generated/edited first information associated with the person. The I/O device 210 may further receive a user input that may include an instruction to determine an empathetically reconciled decision of the plurality of AI models 216 for a request (e.g., the first request) of the person (e.g., the first person). The I/O device 210 may be further configured to provide an output in response to the user input. For example, the I/O device 210 may render the reconciled decision for the first request of the first person (as may be determined by the electronic device 102) on the display screen 212. The I/O device 210 may include various input and output devices, which may be configured to communicate with the processor 204 and other components, such as the network interface 214. Examples of the input devices may include, but are not limited to, a touch screen, a keyboard, a mouse, a joystick, and/or a microphone. Examples of the output devices may include, but are not limited to, a display (e.g., the display screen 212) and a speaker.

The display screen 212 may comprise suitable logic, circuitry, interfaces, and/or code that may be configured to display the reconciled decision for the first request of the first person. The display screen 212 may be configured to receive the user input from the user 110. In such cases the display screen 212 may be a touch screen to receive the user input. The display screen 212 may be realized through several known technologies such as, but not limited to, a Liquid Crystal Display (LCD) display, a Light Emitting Diode (LED) display, a plasma display, and/or an Organic LED (OLED) display technology, and/or other display technologies.

The network interface 214 may comprise suitable logic, circuitry, interfaces, and/or code that may be configured to establish a communication between the electronic device 102, the database 104, and the user-end device 106, via the communication network 108. The network interface 214 may be implemented by use of various known technologies to support wired or wireless communication of the electronic device 102, via the communication network 108. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3:
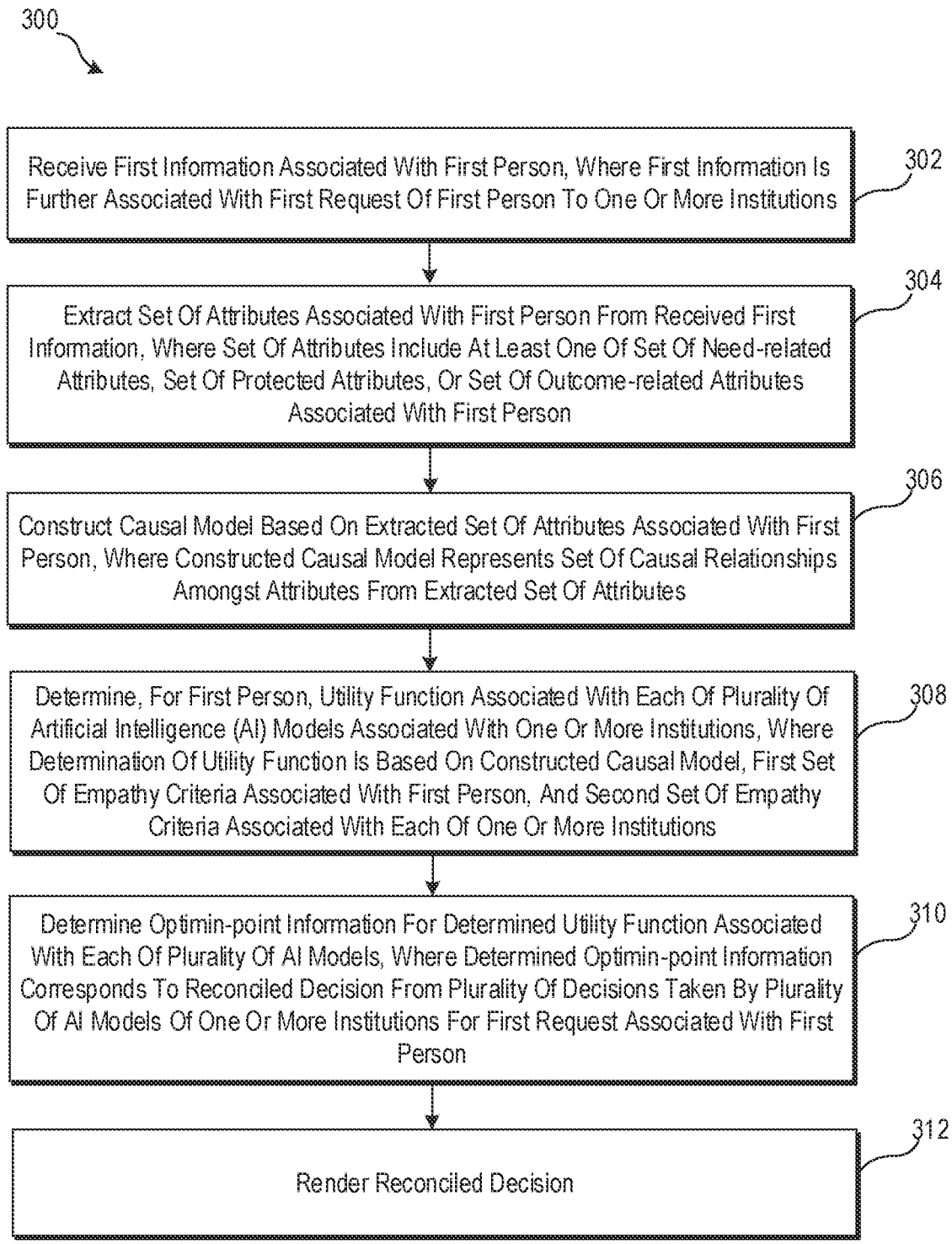
FIG. 3 is a diagram that illustrates a flowchart of an example method for automated empathetic reconciliation of decisions of Artificial Intelligence (AI) models.

FIG. 3 is a diagram that illustrates a flowchart of an example method for automated empathetic reconciliation of decisions of Artificial Intelligence (AI) models, in accordance with an embodiment of the disclosure. FIG. 3 is described in conjunction with elements from FIG. 1, and FIG. 2. With reference to FIG. 3, there is shown a flowchart 300. The method illustrated in the flowchart 300 may start at 302 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 300 may be divided into additional blocks, combined into fewer blocks, or eliminated, depending on the particular implementation.

Figure 4:
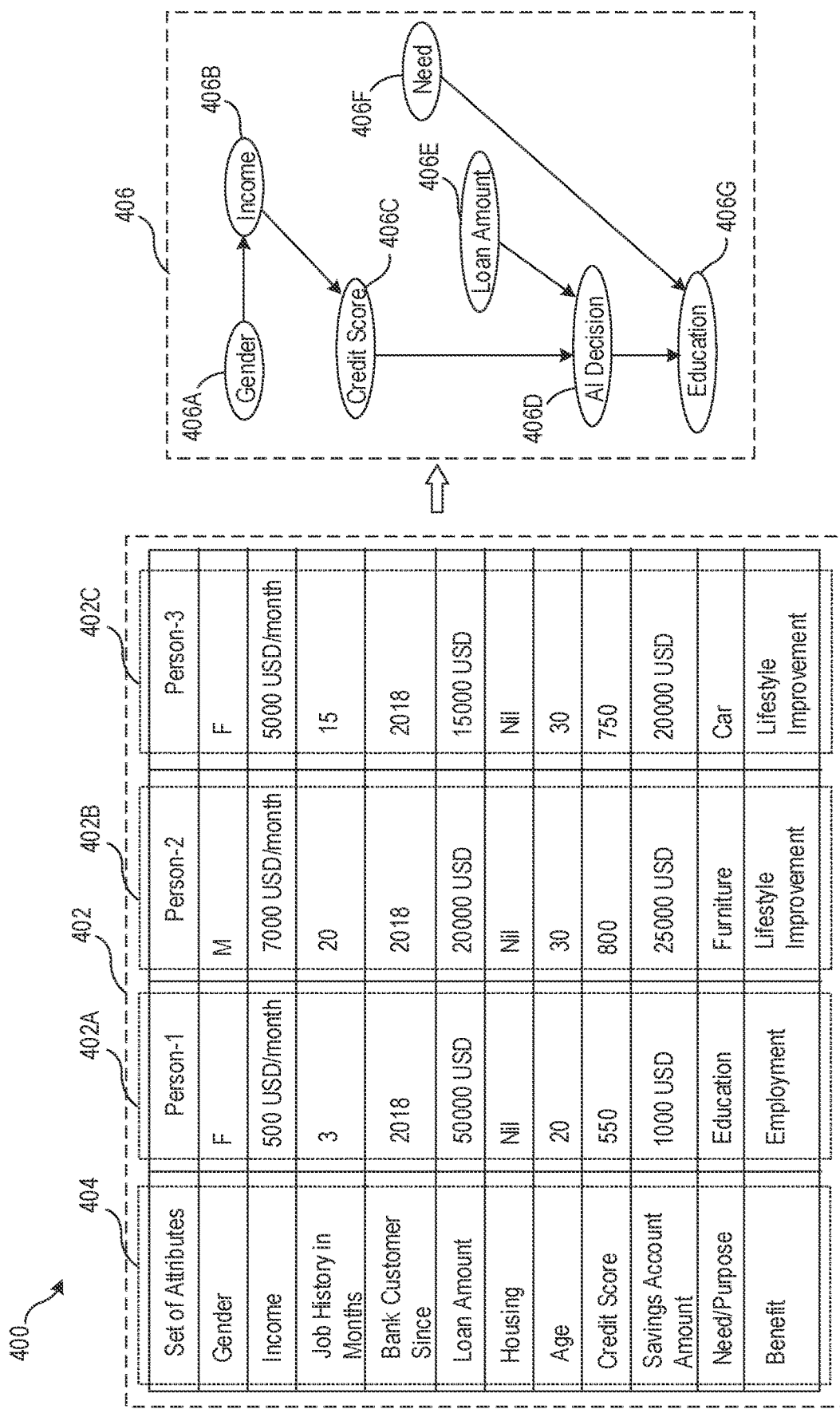
FIG. 4 is a diagram that illustrates an example scenario of construction of a causal model from first information associated with a first person.

At block 302, first information associated with a person (e.g., a first person) may be received. The first information may be further associated with a request (e.g., a first request) of the first person made to one or more institutions. Examples of the one or more institutions may include, but are not limited to, a banking institution, an insurance institution, a hiring organization, an education institute, a travel-related institute, or a judicial court. The first request of the first person may include at least one of, but not limited to, a loan application, an insurance application, a job application, an admission application, a visa application, or a judicial petition application. In an embodiment, the processor 204 may be configured to receive the first information associated with the first person (for example user 110). As an example, the processor 204 may receive the first information 112A associated with the first person. The first information 112A may correspond to a record or a row of information associated with the first person stored in the database 104. Example of the first information 112A is provided in FIG. 4. For example, as shown in FIG. 4, the gender as female, the income as "5000 USD/month", Job history in months as "3", and so on is the first information 112A for the first person. The processor 204 may extract the first information 112A from the database 104 and store the extracted first information 112A in the memory 206 and/or the persistent data storage 208. Alternatively, the processor 204 may acquire the first information 112A based on user input, from the user 110 or from the first person himself/herself.

At block 304, a set of attributes associated with the first person may be extracted from the received first information 112A. In an embodiment, the processor 204 may be configured to extract the set of attributes associated with the first person from the received first information 112A associated with the first person. As an example, the first information 112A (i.e., the record or row of information) associated with the first person may include the set of attributes associated with the first person as fields of the record or row of information. The processor 204 may extract the set of attributes from the various fields of the record or row of information associated with the first information 112A. The set of attributes associated with the first person may include at least one of, but not limited to, the set of need-related attributes 114A, the set of protected attributes 116A, or the set of outcome-related attributes 118A associated with the first person. The set of need-related attributes 114A associated with the first person may correspond to a purpose or need for the first request of the first person to the one or more institutions. Further, the set of protected attributes 116A associated with the first person may include at least one of, but not limited to, an age, a gender, a race, a caste, a salary, a nationality, or a physical disability associated with the first person. The set of outcome-related attributes 118A associated with the first person may correspond to one or more outcomes associated with one or more decisions taken by an AI model of each of the one or more institutions for the first request associated with the first person. A decision of the AI model (i.e. from a plurality of AI models 216) may be one of an acceptance or a rejection of the first request of the first person given by the one or more institutions. Each of the one or more institutions may include the AI model to make the corresponding decision for different requests (such as the first request) received from different people (such as the first person). In some embodiments, different officers or executive employees of the one or more institutions may use the plurality of AI models 216 to make the corresponding decision for different requests (such as the first request) received from different people (such as the first person). Further, the set of outcome-related attributes 118A associated with the first person may also correspond to one or more long-term benefits associated with the first person. An example of the set of attributes associated with the first person is provided, for example, in FIG. 4.

At block 306, a causal model (e.g., the causal model 218) may be constructed based on the extracted set of attributes associated with the first person. The constructed causal model 218 may represent a set of causal relationships amongst attributes from the set of attributes associated with the first person. In an embodiment, the processor 204 may be configured to construct the causal model 218 based on the extracted set of attributes associated with the first person. In an embodiment, the causal model 218 may be represented by a directed acyclic graph of a first set of nodes associated with a set of input variables and a second set of nodes associated with a set of output variables. Herein, the set of input variables may include one or more first attributes from the set of attributes that may affect one or more second attributes from the set of attributes based on a causal relationship with the one or more second attributes. Further, the set of output variables may include the one or more second attributes from the set of attributes that may be affected by the one or more first attributes from the set of attributes based on the causal relationship with the one or more second attributes. The directed acyclic graph of the causal model 218 may include edges between the first set of nodes and the second set of nodes. The edges in the directed acyclic graph may have an outgoing direction with respect to the first set of nodes and an incoming direction with respect to the second set of nodes.

In an embodiment, the construction of the causal model 218 may be further based on at least one of a user input or a structural learning model. For example, the user input may be received from a domain knowledge expert. The user input may indicate the set of input variables and the set of output variables from the set of attributes associated with the first person. The user input may further include the causal relationship between the set of input variables and the set of output variables. In another scenario, the processor 204 may determine the causal model 218 based on a machine learning model. For example, the processor 204 may use the structural learning model to identify the set of input variables and the set of output variables from the first information 112A and determine the causal relationship between the set of input variables and the set of output variables. Based on the identified set of input variables, the set of output variables, and the determined causal relationship, the processor 204 may determine the causal model 218. An example of the constructed causal model is provided, for example, in FIG. 4.

At block 308, for the first person, a utility function associated with each of the plurality of AI models 216 associated with the one or more institutions may be determined. The determination of the utility function may be based on the constructed causal model 218, a first set of empathy criteria associated with the first person, and a second set of empathy criteria associated with each of the one or more institutions. In an embodiment, for the first person, the processor 204 may be configured to determine the utility function associated with each of the plurality of AI models 216 associated with the one or more institutions. Based on the causal relationship between the set of input variables and the set of output variables associated with the causal model 218, the processor 204 may extract the set of need-related attributes 114A, the set of protected attributes 116A, and the set of outcome-related attributes 118A from the set of attributes associated with the first person.

The first set of empathy criteria associated with the first person may include at least one of a first criteria associated with one or more of the set of protected attributes 116A, a second criteria associated with one or more of the set of need-related attributes 114A, or a third criteria associated with one or more of the set of outcome-related attributes 118A. In an embodiment, the first criteria may correspond to a counterfactual criteria that may indicate a first difference. The first difference (e.g., $D_1$) may be between a first probability (e.g., $P_1$) of an acceptance of the first request of the first person with a first value of a first protected attribute (e.g., A=0) of the set of protected attributes 116A and a second probability (e.g., $P_2$) of an acceptance of a second request of a second person with a second value of the first protected attribute (e.g., A=1), considering values of others of the set of attributes are same for both the first person and the second person. The first difference (i.e., $D_1$) may be represented by equation (1) as follows:

$$D_1 = P_1(Y=1|A=0) \cdot P_2(Y=1|A=1) \quad (1)$$

where,
Y may represent a decision taken by an AI model (e.g., an AI Model$_i$) for which a utility function (e.g., $U_i$) is being determined; and
A may represent the first protected attribute (such as gender, age, race).

For example, herein Y=1 may represent a decision of the AI model (e.g., the AI Model$_i$) to accept a request of a person, while Y=0 may represent a decision of the AI model (e.g., the AI Model$_i$) to reject the request of a person.

Further, A=0 may represent the first value of the first protected attribute and A=1 may represent the second value of the first protected attribute. For example, in case the first protected attribute is gender of a person, A=0 may represent that the person is a female and A=1 may represent that the person is a male. With reference to equation (1), in an example, $P_1$ may be a probability that the decision of the AI model (e.g., the AI Model$_i$) is to accept (i.e., Y=1) the first request of the first person, considering that the gender (e.g., the first protected attribute) of the first person is female (i.e., A=0). Further, $P_2$ may be a probability that the decision of the AI model is to accept (i.e., Y=1) a second request of a second person, considering that the gender (i.e., the same first protected attribute) of the second person is male (i.e., A=1). Herein, all remaining attributes (such as age, race, salary, nationality, etc.) of the set of attributes of the first person and the corresponding attributes of the second person may be the same.

In an embodiment, the second criteria may correspond to a first threshold (e.g., $e_1(N)$, wherein N may represent a need) of a first need-related attribute (e.g., the need N) from the set of need-related attributes 114A. In an embodiment, the first difference (e.g., $D_1$) associated with the first criteria may be less than or equal to the first threshold (i.e., $e_1(N)$) corresponding to the second criteria. Thus, the relationship between the first difference (e.g., $D_1$) and the first threshold (i.e., $e_1(N)$) may be represented by the following expression (2):

$$D_1 \leq e_1(N) \quad (2)$$

With reference to expression (2), for example, the first difference (i.e., $D_1$) of the first probability (e.g., $P_1$) of acceptance of a request of a female person and the second probability (e.g., $P_2$) of acceptance of a request of a male person (considering other attributes as same for both the persons) may be within the first threshold (i.e., $e_1(N)$) associated with the need (i.e., the need N) of the persons. The aforementioned conditions (e.g., equation (1) and expression (2)) may factor in a counterfactual fairness and a need-based empathy towards a person (e.g., the first person). The first threshold (i.e., $e_1(N)$) may be different for different types of needs of the first person. For example, for a basic need, such as, education or job, which may be important for a livelihood of a person, the first threshold (i.e., $e_1(N)$) may have a lower value. Thus, the first difference (i.e., $D_1$) between $P_1$ and $P_2$ may have a smaller value and thereby ensure that a decision of the AI model (e.g., the AI Model$_i$) may be fair and empathetic towards both the male person and the female person, in the above example. For other higher-level needs, such as, lifestyle needs (e.g., purchase of a luxury car), the first threshold (i.e., $e_1(N)$) may have a relatively higher value. Therefore, the first difference (i.e., $D_1$) may also have a higher value, which may indicate that a decision of the AI model (e.g., the AI Model$_i$) may be skewed in a favor of one of the genders (e.g., males, in case they have a relatively higher income) than the other gender (i.e., females, in case they have a relatively lower income). The utility function (i.e., $U_i$) associated with the first person for the AI model (e.g., the AI Model$_i$) from the plurality of AI models may be determined based on the first difference ($D_1$) associated with the first criteria. Thus, the utility function (i.e., $U_i$) may factor in the counterfactual fairness and the need-based empathy towards the first person. Based on the utilization of the counterfactual fairness, the disclosed electronic device 102 may be more robust, then conventional systems (such as statistical measure systems).

In an embodiment, the third criteria may correspond to a benefit criteria that may indicate a second difference (e.g., $D_2$). The second difference (i.e., $D_2$) may be between a third probability (e.g., $P_3$) of a first value of a first outcome-related attribute (e.g., W=1) of the set of outcome-related attributes 118A of the first person on an acceptance (i.e., Y=1) of the first request and a fourth probability (e.g., $P_4$) of the first value of the first outcome-related attribute (i.e., W=1) of the first person on a rejection (i.e., Y=0) of the first request of the first person. The second difference (i.e., $D_2$) may be represented by equation (3) as follows:

$$D_2 = P_3(W=1|Y=1) - P_4(W=1|Y=0) \qquad (3)$$

where,

Y may represent a decision taken by the AI model (e.g., the AI Model$_i$) for which the utility function (e.g., $U_i$) is being determined; and W may represent the first outcome-related attribute.

For example, as discussed in the aforementioned, herein Y=1 may represent a decision of the AI model (e.g., the AI Model$_i$) to accept a request of a person, while Y=0 may represent a decision of the AI model (e.g., the AI Model$_i$) to reject the request of a person. Further, W=1 may represent the first value of the first outcome-related attribute. For example, in case the first outcome-related attribute may be a long-term benefit to a person, where W=1 may represent that the person secures a job. With reference to equation (3), in an example, $P_3$ may be a probability that a job (e.g., the first outcome-related attribute) may be secured (i.e., W=1) by the first person, considering that the first request (e.g., an education loan) of the first person is accepted (i.e., Y=1). On the other hand, $P_4$ may be a probability that the job (i.e., the same first outcome-related attribute) may be secured (i.e., W=1) by the first person, considering that the first request (e.g., an education loan) of the first person is rejected (i.e., Y=0).

In an embodiment, the second set of empathy criteria associated with each of the one or more institutions may correspond to a second threshold (e.g., $e_2(c)$) related to a cost (e.g., c) associated with an acceptance of the first request of the first person provided by the one or more institutions. In an embodiment, the second difference (e.g., $D_2$) associated with the third criteria may be less than or equal to the second threshold (e.g., $e_2(c)$) corresponding to the second set of empathy criteria. Thus, the relationship between the second difference (e.g., $D_2$) and the second threshold (i.e., $e_2(c)$) may be represented by the following expression (4):

$$D_2 \leq e_2(c) \qquad (4)$$

With reference to expression (3), for example, the second difference (i.e., $D_2$) of the third probability (i.e., $P_3$) of the person securing a job in case of acceptance of the request and the fourth probability (i.e., $P_4$) of the person securing the job in case of rejection of the request may be within the second threshold (i.e., $e_2(c)$) associated with the cost for the one or more institutions to accept the request. The aforementioned conditions (e.g., equation (3) and expression (4)) may factor in an outcome-based empathy towards a person (e.g., the first person) and a cost-based (or profit-based) empathy towards the one or more institutions. For example, the employment prospects (i.e., an outcome) of the person may be maximized, and simultaneously a risk (i.e., a cost) associated with the acceptance of the request by the one or more institutions may be minimized. The utility function (i.e., $U_i$) associated with the first person for the AI model (e.g., the AI Model$_i$) from the plurality of AI models 216 may be determined based on the second difference ($D_2$) associated with the third criteria. Thus, the utility function (i.e., $U_i$) may factor in the outcome-based empathy towards the first person and the cost-based (or profit-based) empathy towards the one or more institutions.

In an embodiment, for the first person, the utility function (i.e., $U_i$) associated with each of the plurality of AI models 216 of the one or more institutions may be determined based on the first difference (i.e., $D_1$) associated with the first criteria and the second difference (i.e., $D_2$) associated with the third criteria. In an embodiment, the utility function (i.e., $U_i$) may be a sum of the first difference (i.e., $D_1$) and the second difference (i.e., $D_2$) and may be represented by the following equations (5) or (6):

$$U_i = S_i(D_1 + D_2) \qquad (5)$$

$$U_i = S_i(P_1(Y=1|A=0) - P_2(Y=1|A=1) \leq e_1(N) + P_3(W=1|Y=1) - P_4(W=1|Y=0) \leq e_2(c)) \qquad (6)$$

where, $S_i$ may represent an optional application-specific scale-factor based on an application domain associated with the one or more institutions and the first request.

At block 310, optimin-point information for the determined utility function ($U_i$) associated with each of the plurality of AI models 216 may be determined. In an embodiment, the determined optimin-point information may correspond to a reconciled decision from a plurality of decisions taken by the plurality of AI models 216 of the one or more institutions for the first request associated with the first person. In an embodiment, the processor 204 may be configured to determine the optimin-point information for the determined utility function ($U_i$) associated with each of the plurality of AI models 216. The determination of the optimin-point information is described further, for example, in FIG. 5.

At block 312, the reconciled decision may be rendered. In an embodiment, the processor 204 may be configured to render the reconciled decision associated with the plurality of AI models 216, that may be determined based on the optimin-point information. For example, the processor 204 may display the reconciled decision on the display screen 212 of the electronic device 102. Alternatively, the processor 204 may transmit the reconciled decision to the user-end device 106 and may control the user-end device 106 to render the transmitted reconciled decision on a display screen of the user-end device 106. Control may pass to end.

Although the flowchart 300 is illustrated as discrete operations, such as 302, 304, 306, 308, 310, and 312. However, in certain embodiments, such discrete operations may be further divided into additional operations, combined into fewer operations, or eliminated, depending on the particular implementation without detracting from the essence of the disclosed embodiments.

FIG. 4 is a diagram that illustrates an example scenario of construction of a causal model from first information associated with a first person, arranged in accordance with at least one embodiment described in the present disclosure. FIG. 4 is explained in conjunction with elements from FIG. 1, FIG. 2, and FIG. 3. With reference to FIG. 4, there is shown an example scenario 400. The scenario 400 includes a dataset 402 associated with a plurality of persons, such as, a person-1, a person-2, and a person-3. For example, the dataset 402 may include first information 402A associated with the person-1, first information 402B associated with the person-2, and first information 402C associated with the person-3. There is further shown a causal model 406 that may be constructed based on the dataset 402.

Consider an example of a bank as one of the one or more institutions and the person-1 as the first person who may be a customer of the bank. The first request may be a loan application that may be applied by the person-1 (i.e., the first person) to the bank (i.e., the one or more institutions). The first information 402A may be information associated with the person-1 that may be related to the loan application of the person-1 to the bank. In an example, the set of attributes 404 of a person may be attributes associated with the loan application of the person-1 made to the bank. For as shown in FIG. 4, the set of attributes 404 of the person may include, but is not limited to, a gender, an income (e.g., in US Dollars per month), a job history (in months), a time since the person is the customer of the bank, a loan amount (e.g., in US Dollars), a housing (e.g., a property possessed by the person), an age, a credit score, a saving account amount (e.g., in US Dollars), a need/purpose (e.g., for the loan from the bank), and a benefit (e.g., an outcome or a long-term benefit associated with acceptance of the loan) of the person.

The processor 204 may receive the first information 402A associated with the person-1 and extract the set of attributes 404 associated with the person-1 from the first information 402A. For example, as shown in FIG. 4, the person-1 may be a female who may earn 500 USD/month, may be employed for the last 3 months, may be the customer of the bank since the year 2018, and may have applied for a loan of 50000 USD. Further, the person-1 may not have her own house, may be of 20 years old, have a credit score of 550, have a savings bank account amount of 1000 USD, may need a loan for the purpose of education, and may derive a benefit of employment based on a grant of the loan by the bank.

In an embodiment, the processor 204 may be configured to construct the causal model 406 based on the extracted set of attributes 404 associated with the person-1. The causal model 406 may represent a set of causal relationships amongst attributes from the set of attributes 404 associated with the person-1. In an embodiment, the construction of the causal model 406 may be further based on at least one of a user input or a structural learning model. For example, the user input may be received from a domain knowledge expert. The user input may indicate the set of input variables and the set of output variables from the set of attributes 404 associated with the person-1. The user input may further include a causal relationship between the set of input variables and the set of output variables. In an embodiment, the causal model 406 may be represented by a directed acyclic graph of the first set of nodes associated with the set of input variables and the second set of nodes associated with the set of output variables. The directed acyclic graph of the causal model 406 may include edges between the first set of nodes and the second set of nodes. The edges in the directed acyclic graph may have an outgoing direction with respect to the first set of nodes and an incoming direction with respect to the second set of nodes.

For example, as shown in FIG. 4, the causal model 406 may include nodes such as, a first node 406A, a second node 406B, a third node 406C, a fourth node 406D, a fifth node 406E, a sixth node 406F, and a seventh node 406G. The first node 406A may represent the attribute "Gender" of the person-1. The second node 406B may represent the attribute "Income" of the person-1 and the third node 406C may represent the attribute "Credit Score" of the person-1. The fourth node 406D may represent a decision (i.e., "AI Decision") that may be taken by an AI model of the plurality of AI models 216 used by the bank to decide whether to accept or reject the loan application request of the person-1. The fifth node 406E may represent the attribute "Loan Amount" of the person-1 and the sixth node 406F may represent the attribute "Need" (i.e., need/purpose) of the person-1. Further, the seventh node 406G may represent "Education", which may be a benefit attribute (e.g., a long-term benefit or outcome), associated with the person-1.

As shown in the causal model 406, the "Income" (represented by the second node 406B) of the person-1 may be affected by the "Gender" (represented by the first node 406A) of the person-1. For example, typically, a female person may have a lower income than a male person in an organization. Further, the "Credit Score" (represented by the third node 406C) of the person-1 may be affected by the "Income" (represented by the second node 406B) of the person-1. This may be because a person with a higher income may have higher a credit-worthiness and thereby a higher credit score. Furthermore, the "AI Decision" (represented by the fourth node 406D) may be affected by the "Credit Score" (represented by the third node 406C) of the person-1 and the "Loan Amount" (represented by the fifth node 406E) of the person-1. This may be because the loan amount and the credit score of a person may directly affect the decision of the AI model to accept or reject the loan application of the person. On the other hand, the "Need" (represented by the sixth node 406F) of the person-1 and the "AI Decision" (represented by the fourth node 406D) for the loan request of the person-1 may both directly affect the outcome or long-term benefit (i.e., "Education", represented by the seventh node 406G) for the person-1.

It may be noted that the scenario 400 shown in FIG. 4 for the load application of the person-1 to the bank is presented merely as example and should not be construed to limit the scope of the disclosure. In similar manner, the processor 204 may be configured to construct the causal model based on different set of attributes extracted from same or different information associated with people who may have applied different requests (such as, but not limited to, an insurance application, a job application, an admission application, a visa application, or a judicial petition application) to different institutions (such as, but not limited to, insurance institution, a hiring organization, an education institute, a travel-related institute, or a judicial court).

Figure 5:
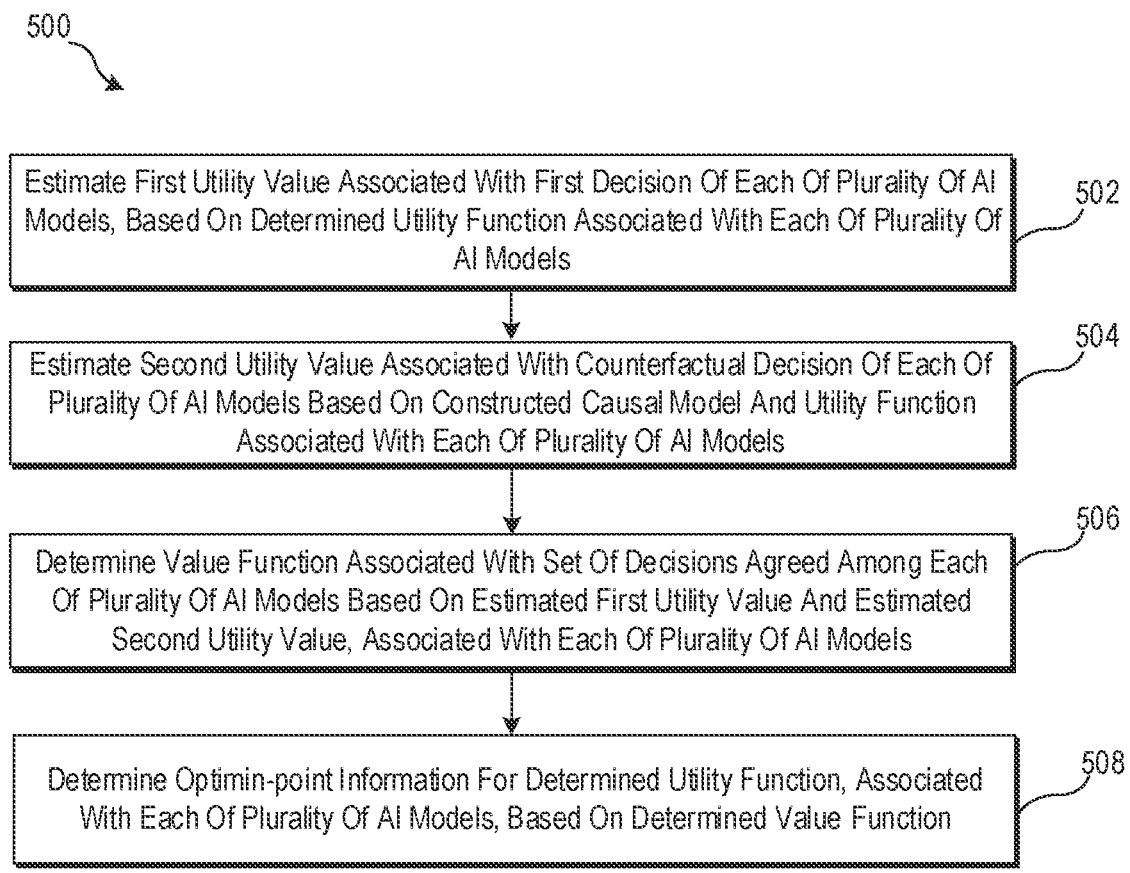
FIG. 5 is a diagram that illustrates a flowchart of an example method for determination of optimin-point information for utility functions of Artificial Intelligence (AI) models, all according to at least one embodiment described in the present disclosure.

FIG. 5 is a diagram that illustrates a flowchart of an example method for determination of optimin-point information for utility functions of Artificial Intelligence (AI) models, arranged in accordance with at least one embodiment described in the present disclosure. FIG. 5 is explained in conjunction with elements from FIG. 1, FIG. 2, FIG. 3, and FIG. 4. With reference to FIG. 5, there is shown a flowchart 500. The method illustrated in the flowchart 500 may start at 502 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 500 may be divided into additional blocks, combined into fewer blocks, or eliminated, depending on the particular implementation.

At block 502, a first utility value associated with a first decision of each of the plurality of AI models 216 may be estimated, based on the determined utility function (i.e., $U_i$) associated with each of plurality of AI models 216. In an embodiment, the processor 204 may be configured to estimate the first utility value associated with a decision (i.e. or the first decision) of each of the plurality of AI models 216, based on the determined utility function (i.e., $U_i$) associated with each of the plurality of AI models 216. The determination of the utility function (i.e., $U_i$) associated with each of the plurality of AI models 216 is described further, for example, in FIG. 3 (at 308). For example, the first decision of an AI model (e.g., the AI Model$_i$) may be a decision to accept the first request associated with the first person. For such first decision of acceptance of the first request, the processor 204 may determine the first utility value (e.g., $U^1_i$) associated with the AI model (i.e., the AI Model$_i$) based on equations (5) or (6), as described further, for example, in FIG. 3 (at 308). In an embodiment, the processor 204 may determine the probabilities P1, P2, P3, and P4 based on first information (e.g., the first information 112A, first information 112B, . . . and first information 112N) associated with a plurality of persons (e.g., the first person, the second person, . . . and the Nth person) stored in the database 104. For example, based on a history of decisions taken by the plurality of AI models 216 for requests received from the plurality of persons and the first information associated with each of the plurality of persons, the processor 204 may determine the probabilities $P_1$, $P_2$, $P_3$, and $P_4$. In an embodiment, the processor 204 may determine the first threshold (i.e., $e_1(N)$) corresponding to the second criteria and the second threshold (i.e., $e_2$ (c)) associated with the cost or profit for the one or more institutions to accept the first request heuristically.

At block 504, a second utility value associated with a counterfactual decision of each of the plurality of AI models 216 may be estimated based on the constructed causal model 218 and the utility function ($U_i$) associated with each of plurality of AI models 216. In an embodiment, the processor 204 may be configured to estimate the second utility value (i.e. associated with the counterfactual decision of each of the plurality of AI models 216) based on the constructed causal model 218 and the utility function ($U_i$) associated with each of plurality of AI models 216. For example, in case the first decision of the AI model (e.g., the AI Model$_i$) is to accept the first request of the first person, the counterfactual decision of the AI model (e.g., the AI Model$_i$) may be a decision to reject the first request of the first person. For such counterfactual decision of rejection of the first request, the processor 204 may determine the second utility value (e.g., $U^2_i$) associated with the AI model (i.e., the AI Model$_i$) based on use a parameterized predictor, such as, a neural network model or a logistic regression model. The parameterized predictor may be used to determine one or more probability values, such as, the probabilities $P_1$ and $P_2$. Based on a loss function (for example, a squared-loss or a log-probability) and a training dataset, an empirical loss of the parameterized predictor may be minimized in terms of the parameter. The loss function of the parameterized predictor may be expressed in terms of a random variable corresponding to a conditional distribution of background variables (e.g., latent variables). The background variables of the conditional distribution may be determined based on the causal model 218. In an embodiment, the loss function may be minimized analytically or based on a Markov Chain Monte Carlo process.

At block 506, a value function (e.g., V) associated with a set of decisions agreed among each of the plurality of AI models 216 may be determined based on the estimated first utility value (e.g., $U^1_i$) and the estimated second utility value (e.g., $U^2_i$), associated with each of plurality of AI models 216. In an embodiment, the processor 204 may be configured to determine the value function (e.g., V) (i.e. associated with the set of decisions agreed among the plurality of AI models 216) based on the estimated first utility value (e.g., $U^1_i$, determined at 502) and the estimated second utility value (e.g., $U^2_i$, determined at 504), associated with each of plurality of AI models 216. For example, the processor 204 may determine a matrix of the utility values (e.g., the first utility value and the second utility value) associated with each of the plurality of AI models 216. A utility value associated with an AI model (e.g., the AI Model$_i$) may represent a payoff or an economic profit associated with a decision taken by the AI model (i.e., the AI Model$_i$) with respect to the first request of the first person. An example of the determined matrix of the utility values of a first AI model (for example associated with a first institution) and a second AI Model (for example associated with a second institution), from the plurality of AI models 216, is provided in following Table 1:

TABLE 1

Matrix of the utility values of the first AI model and the second AI model

| First AI Model | Second AI Model | |
| --- | --- | --- |
| | Reject Decision | Accept Decision |
| Reject Decision | 0, 10 | 100, 50 |
| Accept Decision | 40, 10 | 95, 80 |

For example, with reference to Table 1, for the reject decision of the first AI model and a reject decision of the second AI model, a utility value of the first AI model may be "0" and a utility value of the second AI model may be "10". Further, for the reject decision of the first AI model and an accept decision of the second AI model, the utility value of the first AI model may be "100" and the utility value of the second AI model may be "50". Furthermore, for an accept decision of the first AI model and the reject decision of the second AI model, the utility value of the first AI model and the utility value of the second AI model may be "40" and "10", respectively. Similarly, the utility value of the first AI model and the utility value of the second AI model may be "95" and "80", respectively, for the accept decision of both the first AI model and the second AI model. It should be noted that data provided in Table 1 may merely be taken as experimental data and may not be construed as limiting the present disclosure.

The processor 204 may determine the value function from the determined matrix of the utility values associated with each of the plurality of AI models 216 based on a game theory technique. The value function may correspond to a minimum utility value of each of the plurality of AI models 216 for a certain agreement of decisions between the plurality of AI models 216. For example, an agreement between the plurality of AI models 216 (e.g., the first AI model and the second AI model) on the set of decisions of the plurality of AI models 216 may be modeled as a non-cooperative game as players or actors associated with the game may not form alliances or may be modeled as a game in which agreements between the players may be required to be self-enforcing (e.g., through credible threats). With reference to Table 1, for the matrix of the utility values for the first AI model and the second AI model, an example of a value function that may be determined for each of the first AI model and the second AI model is represented in Table 2, as follows:

TABLE 2

Matrix of the value functions for the first AI model and the second AI model

|  | Second AI Model | |
| --- | --- | --- |
| First AI Model | Reject Decision | Accept Decision |
| Reject Decision | 0, 10 | 100, 50 |
| Accept Decision | 40, 10 | 95, 50 |

For example, with reference to Table 1 and Table 2, consider that both the first AI model and the second AI model agree on a decision to accept the first request of the first person, then a minimum utility for the first AI model may be "95". This may be because the second AI model may not deviate from the agreement to accept the first request, as rejection of the first request may be at a lesser utility (i.e., the utility may drop from "80" to "10") for the second AI model. Further, for the second AI model, a minimum utility may be "50". This may be because the first AI model may deviate from the agreement to accept the first request, as rejection of the first request may be at a high utility (i.e., the utility may increase from "95" to "100") for the first AI model. Thus, the value function for the "accept-accept" set of decisions of the first AI model and the second AI model may be "95" and "50". It should be noted that data provided in Table 2 may merely be taken as experimental data and may not be construed as limiting the present disclosure.

In another example, a matrix of utility values determined for the first AI model (e.g., of the first institution), the second AI model (e.g., of the second institution), and a third AI model (e.g., of the third institution), from the plurality of AI models 216, is provided in the following Table 3:

TABLE 3

Matrix of the utility values of the first AI model, the second AI model, and the third AI model

|  | Third AI Model | | | |
| --- | --- | --- | --- | --- |
|  | Reject Decision | | Accept Decision | |
|  | Second AI Model | | | |
| First AI Model | Reject Decision | Accept Decision | Reject Decision | Accept Decision |
| Reject Decision | 0, 10, 5 | 100, 50, 30 | 40, 10, 70 | 80, 60, 100 |
| Accept Decision | 40, 10, 90 | 95, 80, 70 | 50, 100, 80 | 80, 60, 45 |

It should be noted that data provided in Table 3 may merely be taken as experimental data and may not be construed as limiting the present disclosure. With reference to Table 3, for the matrix of the utility values for the first AI model, the second AI model, and the third AI model, an example of a value function that may be determined for each of the first AI model, the second AI model, and the third AI model is represented in Table 4, as follows:

TABLE 4

Matrix of the value functions of the first AI model, the second AI model, and the third AI model

|  | Third AI Model | | | |
| --- | --- | --- | --- | --- |
|  | Reject Decision | | Accept Decision | |
|  | Second AI Model | | | |
| First AI Model | Reject Decision | Accept Decision | Reject Decision | Accept Decision |
| Reject Decision | 0, 10, 5 | 80, 60, 100 | 0, 10, 5 | 80, 60, 100 |
| Accept Decision | 0, 10, 5 | 0, 10, 5 | 40, 10, 90 | 0, 10, 5 |

It should be noted that data provided in Table 4 may merely be taken as experimental data and may not be construed as limiting the present disclosure.

At block 508, optimin-point information for the determined utility function, associated with each of plurality of AI models 216 may be determined, based on the determined value function. In an embodiment, the processor 204 may be configured to determine the optimin-point information for the determined utility function (i.e. associated with each of the plurality of AI models 216), based on the determined value function (determined at 506). For example, consider $(\Delta X_i, u_i)_{i \in N}$ as a non-cooperative game including N-players (e.g., N=1, 2, ... n), where each player may be one of the plurality of AI models 216. In an embodiment, the non-cooperative game may be of a mixed extension. Herein, $\Delta X_i$ may be a set of probability distributions over a finite action set $X_i$ and $u_i: \Delta X_i \rightarrow \mathbb{R}$ may be a von Neumann-Morgenstern expected utility function (e.g., $U_i$) of a player (i.e., the AI Model$_i$) i∈N. A strategy profile including a set of strategies of the N players may be an agreement represented as p∈ΔX. The processor 204 may determine an agreement $\vec{p}$ as an optimin-point (i.e., the optimin-point information) based on the agreement $\vec{p}$ being Pareto optimal with respect to a value function, V: ΔX→$\mathbb{R}^n$. Herein, an $i^{th}$ component of the value function may be defined as $v_i(p) = \min\{u_i(p), \inf_{p'_{-i} \in B_{-i}(p)} u_i(p_i, p'_{-i})\}$. Herein, "inf" may be an infimum value that may correspond to the largest value that may be less than or equal to each value in a set of values. Further, $p_i'$ may be a decision of the $i^{th}$ player that may be a deviation from the agreement p. Furthermore, "−i" may correspond to players other than the $i^{th}$ player. Further, $B_i(p)$ and $B_{-i}(p)$ may be better-responses correspondences, which may be represented by equations (7a) and (7b), as follows:

$$B_i(p)\{p'_i \in \Delta X_i | u_i(p'_i, p_{-i}) > u_i(p_i, p_{-i})\} \quad (7a)$$

$$B_{-i}(p) = X_{j \in N \setminus \{i\}}(B_j(p) \cup \{p_j\}) \quad (7b)$$

The optimin-point (i.e., the agreement $\vec{p}$, which is also referred herein as the optimin-point information) may be determined as the Pareto optimal solution of a multi-objective optimization problem represented by expression (8), as follows:

$$\vec{p} \in \operatorname{argmax}_{\vec{p} \in \Delta X}(\inf_{p'_{-1} \in B_{-1}(\vec{p})} u_1(\hat{p}_1, p'_{-1}), \inf_{p'_{-2} \in B_{-2}(\vec{p})} u_1(\hat{p}_2, p'_{-2}), \ldots, \inf_{p'_{-n} \in B_{-n}(\vec{p})} u_1(\hat{p}_n, p'_{-n})) \quad (8)$$

Herein, the $i^{th}$ player's (i.e., the AI Model$_i$) value $v_i(p)$ may correspond to a worst-case payoff that the $i^{th}$ player may receive based on the agreement p between the N players. The players of the non-cooperative game may not be bound by the agreement and may break the agreement based on a choice of another non-agreed decision. Thus, $v_i(p)$ may correspond to a minimum utility of the $i^{th}$ player when all players abide by the agreement or one or more players deviate from the agreement for better utility returns.

For example, with reference to Tables 1 and 2, the processor 204 may determine the optimin-point information as "100, 50" based on the maximum value of combined utility across all agreements for the first AI model and the second AI model. The processor 204 may determine the reconciled decision based on the optimin-point information. For example, the set of decisions "reject-accept" may be determined as a reconciled decision for the first AI model and the second AI model. In another example, with reference to Tables 3 and 4, the processor 204 may determine the optimin-point information as "80, 60, 100". The set of decisions "reject-accept-reject" or "reject-accept-accept" may be determined as a reconciled decision for the first AI model, the second AI model, and the third AI model. Control may pass to end. Therefore, the disclosed electronic device 102 may be configured to determine the reconciled decision from the plurality of decisions taken by the of AI models 216 of the one or more institutions, even though different AI models provides contradicting decisions for the first request associated with the first person.

Although the flowchart 500 is illustrated as discrete operations, such as 502, 504, 506, and 508. However, in certain embodiments, such discrete operations may be further divided into additional operations, combined into fewer operations, or eliminated, depending on the particular implementation without detracting from the essence of the disclosed embodiments.

The disclosed electronic device 102 may empathically reconcile decisions taken by the plurality of AI models 216 associated with the one or more institutions for the first request of the first person with minimal biases. The electronic device 102 may construct the causal model 218 indicative of causal relationships between different attributes (e.g., the set of protected attributes 116A, the set of need-related attributes 114A, and the set of outcome-related attributes 118A) associated with the first person. Further, the electronic device 102 may determine the utility function for each of the plurality of AI models 216 used by the one or more institutions for decision-making. The utility function may be determined based on the causal model 218, the first empathy criteria associated with the first person, and the second empathy criteria associated with the one or more institutions. The utility function for a certain AI model may be indicative of a profit gained by the one or more institutions when the particular AI model takes a certain decision, for example, a decision to accept the first request of the first person. Further, the utility function may factor in a fairness towards the first person based on the set of protected attributes 116A of the first person, determined based on the causal model 218. In addition, the utility function may incorporate empathy towards the first person, based on the first set of empathy criteria (e.g., the second criteria associated with the set of need-related attributes 114A and the third criteria associated with the set of outcome-related attributes 118A). Furthermore, the utility function may also incorporate empathy towards the one or more institutions, based on the second set of empathy criteria (e.g., the threshold associated with the cost or profits to accept the first request of the first person). The disclosed electronic device 102 may reconcile the plurality of decisions of the plurality of AI models 216 based on a determination of optimin-point information for the determined utility function for each of the plurality of AI models 216. The determined optimin-point information may indicate the reconciled decision from the plurality of decisions taken by the plurality of AI models for the first request for the first person. Further, the reconciled decision indicated by the determined optimin-point information may favor all stakeholders (i.e. customers, executives, regulatory authorities, government authorities related to the one or more institutions) affected by the plurality of AI models 216. Thus, the plurality of decisions taken by the plurality of AI models 216 associated with the one or more institutions may be reconciled into a single reconciled decision for the first request. The reconciled decision may be fair and empathetic towards the first person and may also be empathetic towards the one or more institutions.

Various embodiments of the disclosure may provide one or more non-transitory computer-readable storage media configured to store instructions that, in response to being executed, cause a system (such as, the example electronic device 102) to perform operations. The operations may include receiving first information associated with a first person. The first information may be further associated with a first request of the first person to one or more institutions. The operations may further include extracting a set of attributes associated with the first person from the received first information. The set of attributes may include at least one of a set of need-related attributes, a set of protected attributes, or a set of outcome-related attributes associated with the first person. The operations may further include constructing a causal model based on the extracted set of attributes associated with the first person. The constructed causal model may represent a set of causal relationships amongst attributes from the extracted set of attributes. The operations may further include determining, for the first person, a utility function associated with each of a plurality of Artificial Intelligence (AI) models associated with the one or more institutions. The determination of the utility function may be based on the constructed causal model, a first set of empathy criteria associated with the first person, and a second set of empathy criteria associated with each of the one or more institutions. The operations may further include determining optimin-point information for the determined utility function associated with each of the plurality of AI models. The determined optimin-point information may correspond to a reconciled decision from a plurality of decisions taken by the plurality of AI models of the one or more institutions for the first request associated with the first person. The operations may further include rendering the reconciled decision.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor, comprising:
    receiving first information associated with a first person, the first information is further associated with a first request of the first person to one or more institutions;
    extracting a set of attributes associated with the first person from the received first information, wherein the set of attributes comprise at least one of a set of need-related attributes, a set of protected attributes, or a set of outcome-related attributes associated with the first person;
    constructing a causal model based on the extracted set of attributes associated with the first person, wherein the constructed causal model represents a set of causal relationships amongst attributes from the extracted set of attributes;
    determining, for the first person, a utility function associated with each of a plurality of Artificial Intelligence (AI) models associated with the one or more institutions,
        the determination of the utility function is based on the constructed causal model, a first set of empathy criteria associated with the first person, and a second set of empathy criteria associated with each of the one or more institutions;
    estimating a first utility value associated with a first decision of each of the plurality of AI models, based on the determined utility function associated with each of the plurality of AI models;
    estimating a second utility value associated with a counterfactual decision of each of the plurality of AI models based on the constructed causal model and the utility function associated with each of the plurality of AI models;
    determining optimin-point information for the determined utility function associated with each of the plurality of AI models based on the estimated first utility value and the estimated second utility value, wherein the determined optimin-point information corresponds to a reconciled decision from a plurality of decisions taken by the plurality of AI models of the one or more institutions for the first request associated with the first person; and
    rendering the reconciled decision.

2. The method according to claim 1, wherein
    the one or more institutions comprise one of a banking institution, an insurance institution, a hiring organization, an education institute, a travel-related institute, or a judicial court, and
    the first request of the first person comprises at least one of a loan application, an insurance application, a job application, an admission application, a visa application, or a judicial petition application.

3. The method according to claim 1, wherein a decision of an AI model, from the plurality of AI models, is one of an acceptance or a rejection of the first request of the first person given by the one or more institutions.

4. The method according to claim 1, wherein the set of need-related attributes associated with the first person corresponds to a purpose for the first request of the first person to the one or more institutions.

5. The method according to claim 1, wherein the set of protected attributes associated with the first person comprises at least one of an age, a gender, a race, a caste, a salary, a nationality, or a physical disability associated with the first person.

6. The method according to claim 1, wherein the set of outcome-related attributes associated with the first person corresponds to one or more outcomes associated with one or more decisions taken by an AI model of the one or more institutions for the first request associated with the first person.

7. The method according to claim 1, wherein the set of outcome-related attributes associated with the first person corresponds to one or more long-term benefits associated with the first person.

8. The method according to claim 1, wherein the construction of the causal model is further based on at least one of a user input or a structural learning model.

9. The method according to claim 1, wherein
the first set of empathy criteria associated with the first person comprises at least one of:
a first criteria associated with one or more of the set of protected attributes associated with the first person,
a second criteria associated with one or more of the set of need-related attributes associated with the first person, or
a third criteria associated with one or more of the set of outcome-related attributes associated with the first person.

10. The method according to claim 9, wherein the first criteria corresponds to a counterfactual criteria that indicates a first difference between a first probability of an acceptance of the first request of the first person with a first value of a first protected attribute of the set of protected attributes and a second probability of an acceptance of a second request of a second person with a second value of the first protected attribute, considering values of others of the set of attributes are same for both the first person and the second person.

11. The method according to claim 9, wherein the second criteria corresponds to a first threshold of a first need-related attribute from the set of need-related attributes.

12. The method according to claim 11, wherein
a first difference associated with the first criteria is less than or equal to the first threshold corresponding to the second criteria, and
the utility function associated with the first person for an AI model from the plurality of AI models is determined based on the first difference associated with the first criteria.

13. The method according to claim 9, wherein the third criteria corresponds to a benefit criteria that indicates a second difference between a third probability of a first value of a first outcome-related attribute of the set of outcome-related attributes of the first person on an acceptance of the first request of the first person and a fourth probability of the first value of the first outcome-related attribute of the first person on a rejection of the first request of the first person.

14. The method according to claim 9, wherein the second set of empathy criteria associated with each of the one or more institutions correspond to a second threshold related to a cost associated with an acceptance of the first request of the first person provided by the one or more institutions.

15. The method according to claim 14, wherein
a second difference associated with the third criteria is less than or equal to the second threshold corresponding to the second set of empathy criteria, and
the utility function associated with the first person for an AI model from the plurality of AI models is determined based on the second difference associated with the third criteria.

16. The method according to claim 1, further comprising:
determining a value function associated with a set of decisions agreed among each of the plurality of AI models based on the estimated first utility value and the estimated second utility value, associated with each of the plurality of AI models; and
the determination of the optimin-point information for the determined utility function, associated with each of the plurality of AI models, is based on the determined value function.

17. One or more non-transitory computer-readable storage media configured to store instructions that, in response to being executed, cause an electronic device to perform operations, the operations comprising:
receiving first information associated with a first person, the first information is further associated with a first request of the first person to one or more institutions;
extracting a set of attributes associated with the first person from the received first information, wherein the set of attributes comprise at least one of a set of need-related attributes, a set of protected attributes, or a set of outcome-related attributes associated with the first person;
constructing a causal model based on the extracted set of attributes associated with the first person, wherein the constructed causal model represents a set of causal relationships amongst attributes from the extracted set of attributes;
determining, for the first person, a utility function associated with each of a plurality of Artificial Intelligence (AI) models associated with the one or more institutions,
the determination of the utility function is based on the constructed causal model, a first set of empathy criteria associated with the first person, and a second set of empathy criteria associated with each of the one or more institutions;
estimating a first utility value associated with a first decision of each of the plurality of AI models, based on the determined utility function associated with each of the plurality of AI models;
estimating a second utility value associated with a counterfactual decision of each of the plurality of AI models based on the constructed causal model and the utility function associated with each of the plurality of AI models;
determining optimin-point information for the determined utility function associated with each of the plurality of AI models based on the estimated first utility value and the estimated second utility value, wherein the determined optimin-point information corresponds to a reconciled decision from a plurality of decisions taken by the plurality of AI models of the one or more institutions for the first request associated with the first person; and
rendering the reconciled decision.

18. The one or more non-transitory computer-readable storage media according to claim 17, wherein the operations further comprise:
determining a value function associated with a set of decisions agreed among each of the plurality of AI models based on the estimated first utility value and the estimated second utility value, associated with each of the plurality of AI models; and
the determination of the optimin-point information for the determined utility function, associated with each of the plurality of AI models, is based on the determined value function.

19. An electronic device, comprising:
a memory storing instructions; and
a processor, coupled to the memory, that executes the instructions to perform a process comprising:
receiving first information associated with a first person, the first information is further associated with a first request of the first person to one or more institutions;
extracting a set of attributes associated with the first person from the received first information, wherein the set of attributes comprise at least one of a set of need-related attributes, a set of protected attributes, or a set of outcome-related attributes associated with the first person;

constructing a causal model based on the extracted set of attributes associated with the first person, wherein the constructed causal model represents a set of causal relationships amongst attributes from the extracted set of attributes;

determining, for the first person, a utility function associated with each of a plurality of Artificial Intelligence (AI) models associated with the one or more institutions, the determination of the utility function is based on the constructed causal model, a first set of empathy criteria associated with the first person, and a second set of empathy criteria associated with each of the one or more institutions;

estimating a first utility value associated with a first decision of each of the plurality of AI models, based on the determined utility function associated with each of the plurality of AI models;

estimating a second utility value associated with a counterfactual decision of each of the plurality of AI models based on the constructed causal model and the utility function associated with each of the plurality of AI models;

determining optimin-point information for the determined utility function associated with each of the plurality of AI models, wherein the determined optimin-point information corresponds to a reconciled decision from a plurality of decisions taken by the plurality of AI models of the one or more institutions for the first request associated with the first person; and rendering the reconciled decision.

20. The electronic device according to claim 19, wherein the process further comprises:

determining a value function associated with a set of decisions agreed among each of the plurality of AI models based on the estimated first utility value and the estimated second utility value, associated with each of the plurality of AI models; and the determination of the optimin-point information for the determined utility function, associated with each of the plurality of AI models, is based on the determined value function.

* * * * *